United States Patent
Cook et al.

(10) Patent No.: US 6,459,908 B1
(45) Date of Patent: *Oct. 1, 2002

(54) METHOD AND SYSTEM FOR SUPPORTING WIRELESS FEATURES IN A GENERIC C WIRELINE ARCHITECTURE

(75) Inventors: Charles I. Cook, Louisville; Dennis C. Smith, Longmont, both of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/224,471

(22) Filed: Dec. 31, 1998

(51) Int. Cl.⁷ .................................................. H04B 1/38
(52) U.S. Cl. ........................ 455/560; 455/450; 455/460
(58) Field of Search ................................. 455/461, 426, 455/445, 560, 422, 555, 450, 460, 455; 370/466, 467

(56) References Cited

U.S. PATENT DOCUMENTS

| | | | | |
|---|---|---|---|---|
| 5,353,331 A | * | 10/1994 | Emery et al. ................ 455/461 |
| 5,506,887 A | * | 4/1996 | Emery et al. ................ 455/461 |
| 5,901,359 A | * | 5/1999 | Malmstrom .................. 455/461 |
| 6,073,029 A | * | 6/2000 | Smith et al. ................. 455/555 |
| 6,097,966 A | * | 8/2000 | Hanley ........................ 455/555 |
| 6,104,928 A | * | 8/2000 | Waugh ........................ 455/445 |

* cited by examiner

Primary Examiner—Nay Maung
Assistant Examiner—Sonny Trinh
(74) Attorney, Agent, or Firm—Brooks & Kushman P.C.

(57) ABSTRACT

A method and system is provided for transparently supporting a wireless service protocol such as IS-53 in a Generic C integrated wireless and wireline communication system operating with a wireline service protocol such as LSSGR. The Generic C architecture is provided with the capability of supporting common cellular system IS-53 wireless features in addition to the wireline LSSGR features otherwise provided by either translating wireless invocation codes to wireline invocation codes, or directing call processing to a dedicated wireless system mobile switching center (MSC) arranged to process IS-53 protocol. Feature code translation is performed in a wireless system location register (WSLR) to enable transparent IS-53 feature code support on a CLASS 5 wireline switch equipped with LSSGR features. Alternatively, upon inquiry from an access manager (AM), the WSLR directs the AM to route the call to the dedicated MSC for IS-53 code processing.

9 Claims, 2 Drawing Sheets

METHOD AND SYSTEM FOR SUPPORTING WIRELESS FEATURES IN A GENERIC C WIRELINE ARCHITECTURE

TECHNICAL FIELD

The present invention relates to a method and system for supporting cellular calling features in a system using wireline invocation codes (LSSGR).

BACKGROUND ART

Generally, communication systems have been introduced which integrate wireless communication networks, such as a personal communication system (PCS), with existing wireline communication networks. In such systems, structure is provided for interfacing the capabilities of a land line telephone system with a radio link communications system, and to control the provision of private network service features for users of both radio link systems and land line systems. Call processing data associated with each subscriber is stored in a central service control point, or database, within the network. Call routing to either a land line or a wireless unit is controlled by a mobile controller network element in conjunction with the central database. Known systems can typically support all the services unique to each of the wireline telephone network and the wireless network using a single directory number and a central database.

One such arrangement is known as a Generic C architecture. In a Generic C architecture, delivery of wireline features to wireless access systems is supported without requiring a Mobile Switching Center (MSC) network element. However, it would also greatly enhance system capability if wireless features such as provided by the IS-53 protocol were also supported by a Generic C architecture. To date, no such system satisfies such a demand.

In addition, subscribers who roam into a Generic C network will not necessarily have knowledge of the Generic C architecture and will expect services to conform to the IS-53 protocol instead of a LSSGR protocol as utilized by an Access Manager (AM) in a Generic C architecture. Further yet, a market may exist for subscribers who prefer IS-53 services over LSSGR services. Therefore, a need exists for a Generic C architecture capable of transparently supporting IS-53 protocol in addition to the normal wireline LSSGR protocol.

DISCLOSURE OF THE INVENTION

It is therefore an object of the present invention to provide a method and system for supporting IS-53 wireless services in a Generic C integrated wireline and wireless communication system.

It is another object of the present invention to provide an integrated wireless/wireline telecommunications services utilizing feature code translation on a SCP platform in order to support IS-53 wireless services as well as LSSGR wirleine services.

It is yet another object of the present invention to provide a Generic C integrated wireless/wireline telecommunication system capable of supporting IS-53 services by utilizing a subscriber profile to connect a call to an MSC platform for IS-53 feature and call control.

In carrying out the above objects and other objects, features, and advantages of the present invention, a method and system are provided for transparently supporting a wireless service protocol in a Generic C integrated wireless and wireline network which includes maintaining a database containing user profile information indicative of mobile transceiver unit service registration status in a wireless location register associated with each of a plurality of geographic coverage areas. When an incoming call is received at a wireless access manager, a query is generated for the wireless location register for instructions on how to process the call. The wireless location register determines whether the user requires wireless service protocol processing based on the user profile, and generates special handling instructions in response thereto. In accordance with a first aspect of the present invention, the special handling instructions comprise translating the call feature coding into a wireline service protocol utilized by the Generic C communication system. In accordance with another aspect of the present invention, the wireless location register instructs the access manager to forward the call to a wireless system mobile switching center for call handling and routing to the wireline network.

More specifically, in accordance with one embodiment of the present invention, a Generic C architecture is provided with the capability of supporting common cellular system IS-53 wireless features in addition to the wireline LSSGR features otherwise provided by either translating wireless invocation codes to wireline invocation codes, or directing call processing to a dedicated mobile switching center (MSC) arranged to process IS-53 protocol. Feature code translation is performed in a wireless system location register (WSLR) to enable transparent IS-53 feature code support on a CLASS 5 wireline switch equipped with LSSGR features. Alternatively, upon inquiry from an access manager (AM), the WSLR directs the AM to route the call to the dedicated MSC for IS-53 code processing.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
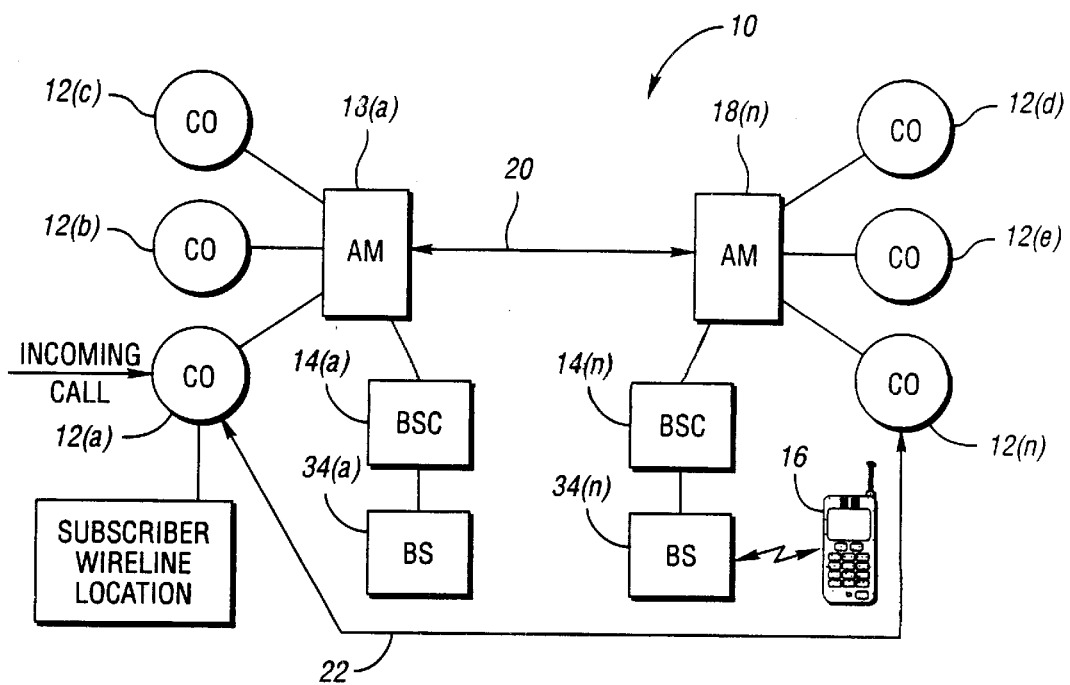
FIG. 1 is a schematic representation of a communication system in accordance with the present invention.

FIG. 1 illustrates a communication system 10 in accordance with the present invention. More specifically, communication system 10 is an integrated wireline and wireless system, i.e., a "Generic C" architecture, having a plurality of wireline CLASS 5 switching central offices (CO) 12(a) through 12(n) connected to a plurality of base stations 14(a)–14(n) of a wireless network. Each respective base station 14 serves a corresponding set of subscriber mobile terminal units 16. The use of a Generic C architecture advantageously allows calls to a wireless subscriber without the need for a mobile switching center (MSC).

A set of access manager (AM) 18(a)–18(n) are provided for management of base station radio functions and switch connections to a given base station. Each CO 12 is associated with a respective AM via an appropriate access connection. The individual AMs 18 are linked together for inter-AM and hand-off communication using a high speed asynchronous transfer mode (ATM) protocol line 20, such as an IS-634 protocol.

The COs interface with a public switched telephone network (PSTN) and are set up to service individual mobile terminal units via the use of a single unique directory number. Incoming calls from the PSTN are thus routed to an assigned CLASS 5 CO, which then seeks to route the incoming call to its corresponding link AM via the Generic C interface. As shown in FIG. 1, COs 12 are geographically distributed and linked only to a designated AM. Communications between different COs are supported via conventional interoffice trunk lines 22.

Figure 2:
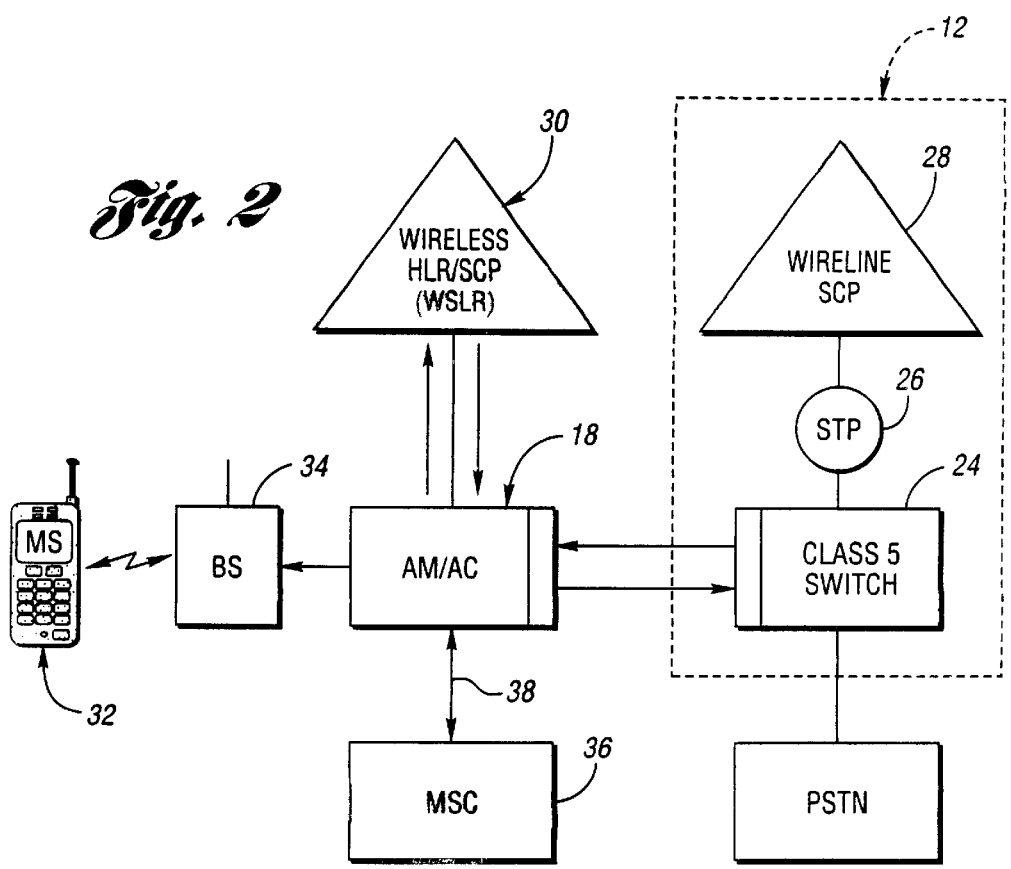
FIG. 2 is a schematic representation showing the connection of a wireline central office to an access manager in a wireless network in accordance with the present invention.

FIG. 2 illustrates an exemplary embodiment showing the communication link between a CO and its linked AM. More specifically, CO 12 forms one of the network elements in the wireline network. The CO includes a CLASS 5 digital switching system 24 which interfaces with the PSTN. In addition, other network elements include Signaling Transfer Points (STPs) 26 and Service Control Point (SCP) databases 28. Switching system 24 is arranged in accordance to perform call processing on calls that originate, tandem or terminate at assigned sites. STPs 26 are used to facilitate call and feature control signal routing between wireline switching systems 24 and external SCP databases 28, as well as a plurality of wireline terminal units (not shown). Common Channel Signaling System No.7 protocol (SS7) is employed in the wireline network to support communication of signaling information relating to call setup, control, management and maintenance and Inter-network system signaling between the wireline and mobile network systems.

The mobile network includes a wireless location register 30, i.e., a Home Location Register/Visitor Location Register (VLR/HLR), and a plurality of wireless subscriber mobile terminal units 32. The functions performed by wireless location register 30 may be carried out either within a mobile switching system (particularly if such an element is employed in the wireless network), or external thereto as shown. Together, AM 18 and wireless location register 30 are responsible for management and processing of calls to and from mobile terminal units 32 registered in the geographic zone of coverage. Except as described below, the basic operations of all the above components are generally known to one skilled in the art. In general, AM 18 controls call delivery within the mobile network for mobile-to-mobile calls, as well as between the mobile network and the wireline network for wireline-to-mobile and mobile-to-wireline calls. AM 18 can be integrated with an access controller (AC), and is connected to VLR/HLR 30 to manage mobility of wireless units throughout the wireless network.

In normal operation, when AM 18 receives a call from the wireline network which is directed to a wireless unit 32, the AM deciphers the telephone number and alerts an appropriate base station (BS) 34 via its BCS to page the corresponding wireless unit 32. Similarly, when wireless unit 32 places a call, AM 18 accepts the dialing data from the BSC and dials the desired number for transmission to wireline network switch 24. The AM also processes mobile registration status data received from a BSC, switches calls to other cells via high speed line 20, processes diagnostic information, and compiles mobile billing statistics.

The wireless location register operates as master database for storing data related to each mobile subscriber, such as subscriber profile and mobility information together with relevant permanent data, such as access capabilities and subscriber services. In addition, the wireless location register provides AM 18 with information regarding the location and status of a mobile termination unit to allow incoming calls to be routed immediately thereto. Thus, AM 18, along with BS 34, and HLR/VLR 30, operates to support basic wireless network operations such as registration, authentication, and call hand off between base stations.

Figure 3:
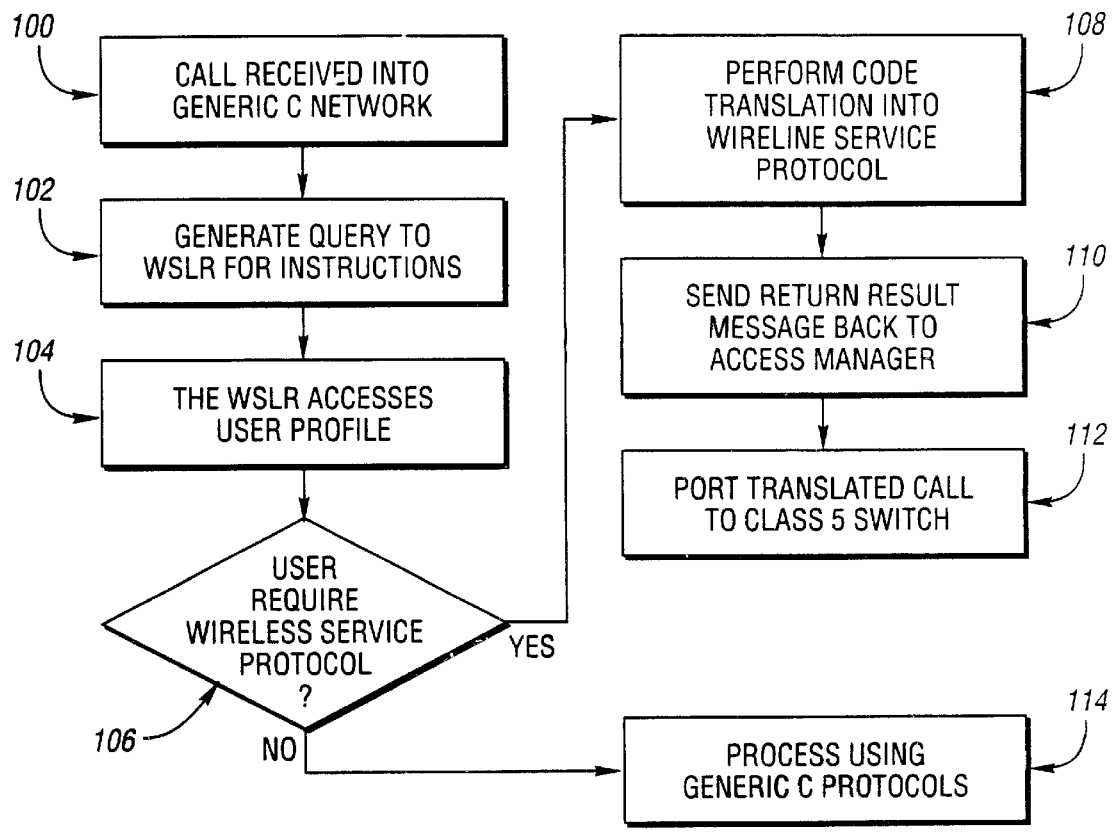
FIG. 3 is a flow chart representing a overall operation of a first embodiment for transparent IS-53 support in accordance with the present invention.

FIG. 3 is a flowchart illustrating overall transparent IS-53 wireless service support in accordance with a first embodiment of the present invention. As indicated at block 100, when a call is received from a mobile unit via a BS 34, the AM/AC generates a query for the WSLR at block 102 using an IS-41 protocol Invoke message. This query includes passing the dialed digits representing the IS-53 feature code signaling and passes the signals to the WSLR/SCP. The WSLR then accesses a subscriber profile at block 104 to determine the type of service protocol, i.e., IS-53 or wireline LSSGR service, applicable to the calling subscriber. The profile allows the WSLR to determine for example wether the caller is actually a nonsubscriber roaming cellular unit.

At block 106, if the WSLR determines that the caller operates using the IS-53 protocol, the WSLR performs code translation of the IS-53 feature coding, such as the dialed digits for call forwarding, into LSSGR coding as denoted at block 108, and returns an IS-41 Return Result message back to the AM/AC at block 110 for porting of the call to a particular CLASS 5 switch. The AM in conjunction with the AC then outputs the resulting wireline feature code signaling to the CLASS 5 wireline switch at block 112. The connection between AC/AM 18 and CLASS 5 switch 24 is arranged to support line-side features, e.g., TR-303, TR-08, twisted copper pairs. Thus, signals originally sent using IS-53 protocol are translated into a format suitable for processing by the wireline switch. Otherwise, normal Generic C protocols are used to process the call as denoted at block 114.

As a result, feature code translation in accordance with the present invention provides wireless feature capability to enable PIC (Preferred Inter-exchange Carrier) codes to be supported by the Generic C architecture. In addition, this capability further provides the ability to support changes in numbering plans that may occur as a mobile roams from switch to switch. Still further, this capability enables feature screening in the wireless system to provide additional flexibility in feature offerings, and may simplify support of LAES (Lawfully Authorized Electronic Surveillance) type arrangements.

Referring again to FIG. 2, the present invention provides an alternative embodiment to WSLR code translation for transparently supporting IS-53 wireless service. More specifically, IS-53 call processing is handled by a dedicated mobile switching center 36 (MSC) such as commonly employed in known cellular systems connected to the AM via a Type 2 trunk or IS-634 connection 38. MSC 36 is known to those skilled in the art as a digital telephone exchange used in nonGeneric C architectures for controlling switching between a wireline network and mobile cell sites for IS-53 protocol wireline-to-mobile, mobile-to-wireline, and mobile-to-mobile calls.

Figure 4:
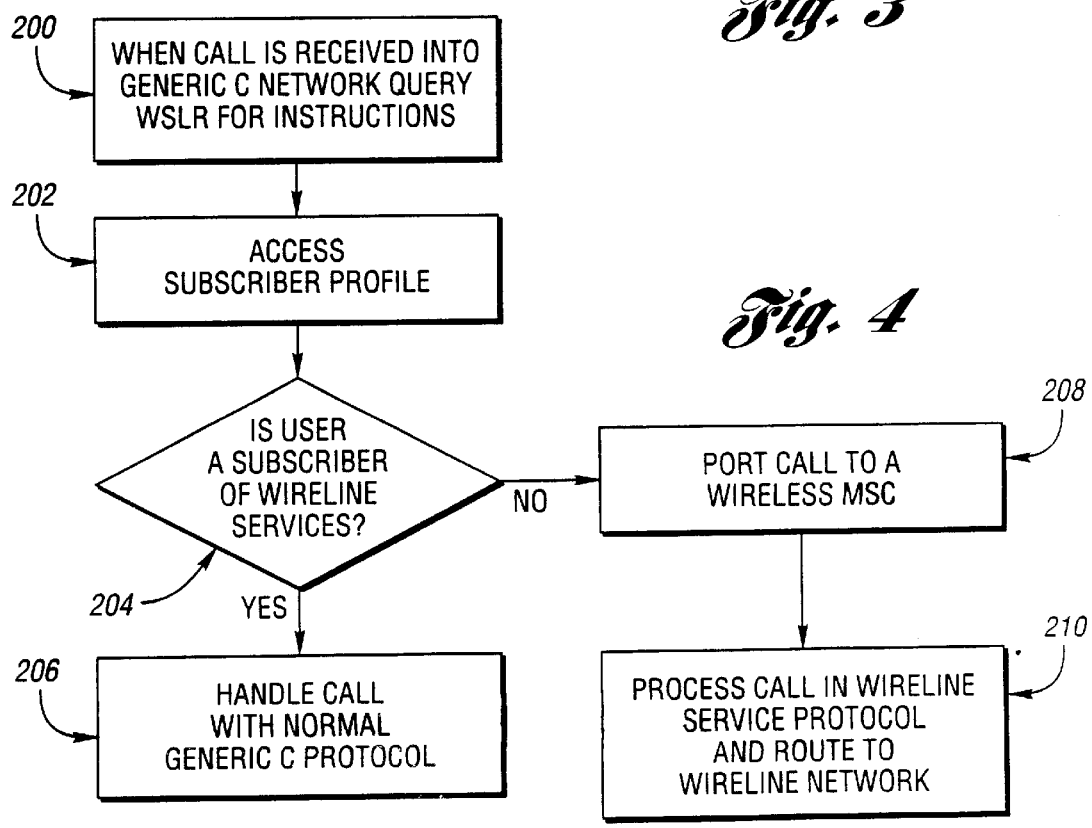
FIG. 4 is a flow chart representing a overall operation of a second embodiment for transparent IS-53 support in accordance with the present invention.

Referring now to FIG. 4, a flow chart illustrates the overall process for transparent IS-53 support in a Generic C system in accordance with the second embodiment. As denoted at block 200, when a call comes into the Generic C Network, the WSLR is queried by the AM to determine how the call is to be handled. As part of the query, a subscriber profile is accessed at block 202 either locally, i.e., maintained within the WSLR if the calling unit is already registered on the network, or by querying the calling unit's HLR if not registered. This query informs the system as to whether the user is a subscriber to IS-$_{53}$ services or LSSGR services. As denoted at block 104, if the user is a subscriber to LSSGR services, the call is handled at block 106 in accordance with normal Generic C protocols. On the other hand, if the user is a subscriber to IS-53 services, the WSLR directs the Access Manager (AM) at block 108 to port the call out through the Type 2 trunk or IS-634 connection to MSC 36. Thereafter, the MSC will perform feature control and call control at block 110 in accordance with normal IS-53 protocols.

Implementation of the AM/MSC elements can be facilitated by utilizing both a TR-303 interface for LSSGR support and IS-634 interface for IS-634 support as part of the AM/AC platform. Alternatively, the AM/AC platform can be arranged to only support LSSGR calls, with the added capability of handing off an IS-53 call to another AM/AC complex that contained the IS-634 functionality or Type 2 trunking capability to allow connection of the call to the MSC.

While the best modes for carrying out the invention have been described in detail, those familiar with the art to which this invention relates will recognize various alternative designs and embodiments for practicing the invention as defined by the following claims.

What is claimed is:

1. In a communication system having a wireline network linked to a wireless network, wherein the communication system operates using a wireline service protocol, a system for transparently supporting a wireless service protocol comprising:

a wireline switch assigned to handle calls to and from the wireline network;

a wireless unit location register associated with a particular geographic coverage area for maintaining a database containing information indicative of mobile transceiver unit registration profile; and an access manager located within each of the plurality of geographic coverage areas and arranged to communicate with the wireless unit location register for managing mobility of mobile transceiver units within the system, wherein the access manager is arranged to query the wireless unit location register for processing instructions in response to receiving a call from a mobile transceiver unit, and in response to the query, the wireless unit location register is arranged to determine from the mobile transceiver registration profile whether the mobile transceiver unit requires wireless service protocol processing or wireline service protocol processing, and processes the call in accordance with the required protocol.

2. The system of claim 1 wherein if the mobile transceiver unit requires wireless service protocol, the wireless unit location register is arranged to translate the wireless service protocol coding of the received call into the wireline service protocol.

3. The system of claim 2 wherein the wireless unit location register is further arranged to forward the translated call back to the access manager for communication to the wireline switch.

4. The system of claim 1 further comprising a mobile switching center arranged to process calls formatted in the wireless service protocol, wherein if the mobile transceiver requires wireless service protocol, the wireless unit location register is arranged to instruct the access manager to forward the received call to the mobile switching center for call processing and routing to the wireline network.

5. In a communication system having a wireline network linked to a wireless network, wherein the communication system operates using a wireline service protocol, a system for transparently supporting an IS-53 wireless service protocol comprising:

a wireline switch assigned to handle calls to and from the wireline network;

a wireless unit location register associated with a particular geographic coverage area for maintaining a database containing information indicative of mobile transceiver unit registration profile; and an access manager located within each of the plurality of geographic coverage areas and arranged to communicate with the wireless unit location register for managing mobility of mobile transceiver units within the system, wherein the access manager is arranged to query the wireless unit location register for processing instructions in response to receiving a call from a mobile transceiver unit, and in response to the query, the wireless unit location register is arranged to determine from the mobile transceiver registration profile whether the mobile transceiver unit requires IS-53 protocol processing or wireline service protocol processing, and processes the call in accordance with the required protocol.

6. A method for transparently supporting a wireless service protocol in a Generic C integrated wireless and wireline network comprising:

maintaining a database in a wireless location register associated with a particular geographic coverage area, the database containing user profile information indicative of mobile transceiver unit service registration status and selected mobile transceiver user services; and in response to receiving a call from a mobile transceiver unit, generating a query for the wireless location register for call processing instructions;

determining at the wireless location register whether the mobile transceiver unit requires wireless service protocol processing or wireline service protocol processing; and processing the call in accordance with the determined service protocol process.

7. The method of claim 6 wherein if the required service protocol is the wireless service protocol, processing the call comprises translating the received call coding from the wireless service protocol into the wireline service protocol.

8. The method of claim 7 further comprising forwarding the translated signal to an access manager for routing to the wireline network.

9. The method of claim 6 wherein if the required service protocol is the wireless service protocol, processing the call comprises instructing an access manager to forward the call to a mobile switching center for call handling and routing to the wireline network.

* * * * *